(12) United States Patent
Ichikawa

(10) Patent No.: US 10,474,215 B2
(45) Date of Patent: Nov. 12, 2019

(54) CONTROL APPARATUS FOR CONTROLLING MEMORY AND CONTROL METHOD FOR POWER SAVING OF MEMORY

(71) Applicant: CANON KABUSHIKI KAISHA, Tokyo (JP)

(72) Inventor: Masanori Ichikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/359,212

(22) Filed: Nov. 22, 2016

(65) Prior Publication Data
US 2017/0153688 A1 Jun. 1, 2017

(30) Foreign Application Priority Data
Nov. 28, 2015 (JP) .................. 2015-232520

(51) Int. Cl.
*G06F 1/00* (2006.01)
*G06F 1/3234* (2019.01)
*G06F 1/3206* (2019.01)
*G06F 1/3287* (2019.01)

(52) U.S. Cl.
CPC .......... *G06F 1/3234* (2013.01); *G06F 1/3206* (2013.01); *G06F 1/3275* (2013.01); *G06F 1/3287* (2013.01); *Y02D 10/14* (2018.01); *Y02D 10/171* (2018.01); *Y02D 50/20* (2018.01)

(58) Field of Classification Search
CPC ........................................... G06F 1/32
See application file for complete search history.

(56) References Cited

U.S. PATENT DOCUMENTS

| 2005/0286322 A1* | 12/2005 | Choi ........................ G11C 7/20 365/194 |
| 2010/0269074 A1* | 10/2010 | Nation ................ G06F 17/5022 716/136 |
| 2013/0021832 A1* | 1/2013 | Yamaki .................. G11C 5/148 365/51 |

(Continued)

FOREIGN PATENT DOCUMENTS

| JP | 2006331107 A | 12/2006 |
| JP | 2007-164822 A | 6/2007 |
| JP | 2013025843 A | 2/2013 |

*Primary Examiner* — Mohammed H Rehman
(74) *Attorney, Agent, or Firm* — Canon U.S.A., Inc. IP Division

(57) ABSTRACT

A control apparatus includes functional modules and an arbitration unit. Each functional module includes a memory capable of transitioning, per a control signal, between a first power state and a second power state consuming lower power than the first power state. The arbitration unit performs control to cause a power state of the memory of one of the functional modules to make a transition. Each functional module receiving a request for power state transition of the memory makes an inquiry of whether the power state of the memory can transition to another state. In response to the inquiry, the arbitration unit issues a permission for transition of the power state of the memory of one of the functional modules. The functional modules that have received the permission from the arbitration unit control the control signal input to the memory, to make the transition of the power state of the memory.

9 Claims, 13 Drawing Sheets

(56) References Cited

U.S. PATENT DOCUMENTS

2013/0326163 A1* 12/2013 Moon ............... G06F 12/00 711/154
2014/0317344 A1* 10/2014 Kim ............... G11C 7/02 711/105

* cited by examiner

FIG.7

| A_RS_REQ | A_CAUSE | B_RS_REQ | B_CAUSE | C_RS_REQ | C_CAUSE | SEL |
|---|---|---|---|---|---|---|
| 1 | 1 | — | — | — | — | A |
| — | — | 1 | 1 | — | — | B |
| — | — | — | — | 1 | 1 | C |
| 1 | 0 | — | — | — | — | A |
| — | — | 1 | 0 | — | — | B |
| — | — | — | — | 1 | 0 | C |
| 0 | 0 | 0 | 0 | 0 | 0 | NONE |

FIG. 12

| A_REQ | A_CAUSE | A_PRI | B_RS_REQ | B_CAUSE | B_PRI | C_RS_REQ | C_CAUSE | C_PRI | SEL |
|---|---|---|---|---|---|---|---|---|---|
| 1 | — | 1 | — | — | — | — | — | — | A |
| — | — | — | 1 | — | 1 | — | — | — | B |
| — | — | — | — | — | — | 1 | — | 1 | C |
| 1 | 1 | 0 | — | — | — | — | — | — | A |
| — | — | — | 1 | 1 | 0 | — | — | — | B |
| — | 0 | 0 | — | — | — | 1 | 1 | — | C |
| 1 | — | — | — | 0 | 0 | — | — | — | A |
| — | — | — | 1 | — | — | — | 0 | 0 | B |
| — | — | 0 | — | — | — | 1 | — | 0 | C |
| 0 | 0 | 0 | 0 | 0 | 0 | 0 | 0 | 0 | NONE |

CONTROL APPARATUS FOR CONTROLLING MEMORY AND CONTROL METHOD FOR POWER SAVING OF MEMORY

BACKGROUND OF THE INVENTION

Field of the Invention

An embodiment relates to a control method for power saving in which a memory can transition from a first power state to a second power state that consumes lower power than the first power state, in accordance with a control signal.

Description of the Related Art

There is a memory that can transition to a low power consumption mode, and return from the low power consumption mode in accordance with a control signal (Japanese Patent Application Laid-Open No. 2007-164822). The memory includes an input node that receives a control signal called a resume-standby (RS) signal (hereinafter, referred to as an RS signal), and transitions to a resume state and to a standby state in accordance with the RS signal.

In Japanese Patent Application Laid-Open No. 2007-164822, a plurality of memories is connected in a daisy chain, and a delay circuit is provided between two memories so that the control signal input to a memory module is delayed on a subsequent stage. Thus, inrush current can be prevented from being generated when the plurality of memory modules returns from the low power consumption mode.

In multifunction peripherals (MFPs) having a plurality of functional modules for a printing function, a scanning function, and the like, power control is preferably performed for each functional module so that power consumption of unused functional modules is reduced. More specifically, a configuration that can perform the power control for each functional module has, for example, the advantage that when the printing function is used, the scanning function is not used, and thus the power consumption can be reduced in the functional module that performs the scanning function.

When a plurality of functional modules is operated in conjunction, they need to concurrently return from a power saving state. For example, when the copy function is performed, both a print image processing module used for performing the printing function and a scan image processing module used for performing the scanning function need to return from the power saving state.

When the plurality of functional modules each independently regulates the control signal input to the memory, memory modules of one or more functional modules might recover from the low power consumption mode at the same timing. Thus, the inrush current is generated when the plurality of functional modules returns from the power saving state.

SUMMARY OF THE INVENTION

An embodiment is directed to a configuration in which generation of an inrush current is suppressed when an apparatus returns from a saving state. The configuration includes a plurality of functional modules having a memory that can transition between a first power state and a second power state that consumes lower power than the first power state in accordance with a control signal.

According to an aspect of the present invention, a control apparatus includes a plurality of functional modules each including a memory capable of transitioning, in accordance with a control signal, between a first power state and a second power state consuming lower power than the first power state, and an arbitration unit configured to perform control in such a manner that a power state of the memory of one of the plurality of functional modules makes a transition, wherein each of the functional modules receiving a request for transition of the power state of the memory makes an inquiry to the arbitration unit of whether the power state of the memory can transition to another state, wherein, in response to the inquiry, the arbitration unit issues a permission for transition of the power state of the memory of one of the functional modules, and wherein the functional modules that have received the permission from the arbitration unit control the control signal input to the memory, to make the transition of the power state of the memory.

Further features of the present invention will become apparent from the following description of exemplary embodiments with reference to the attached drawings.

BRIEF DESCRIPTION OF THE DRAWINGS

FIG. 7 is a truth table used by a target selection unit for determining an image processing unit as a target of mode transition.

FIG. 12 is a truth table used by a target selection unit according to the second exemplary embodiment for determining an image processing unit as a target of a mode transition.

DESCRIPTION OF THE EMBODIMENTS

A first exemplary embodiment is described below with reference to the drawings. In the description below, a power saving control method for a memory is described taking a multifunction peripheral (MFP) as an example. The MFP includes a plurality of functional modules for scanning, printing, copying, and the like, as an example.

Figure 1:
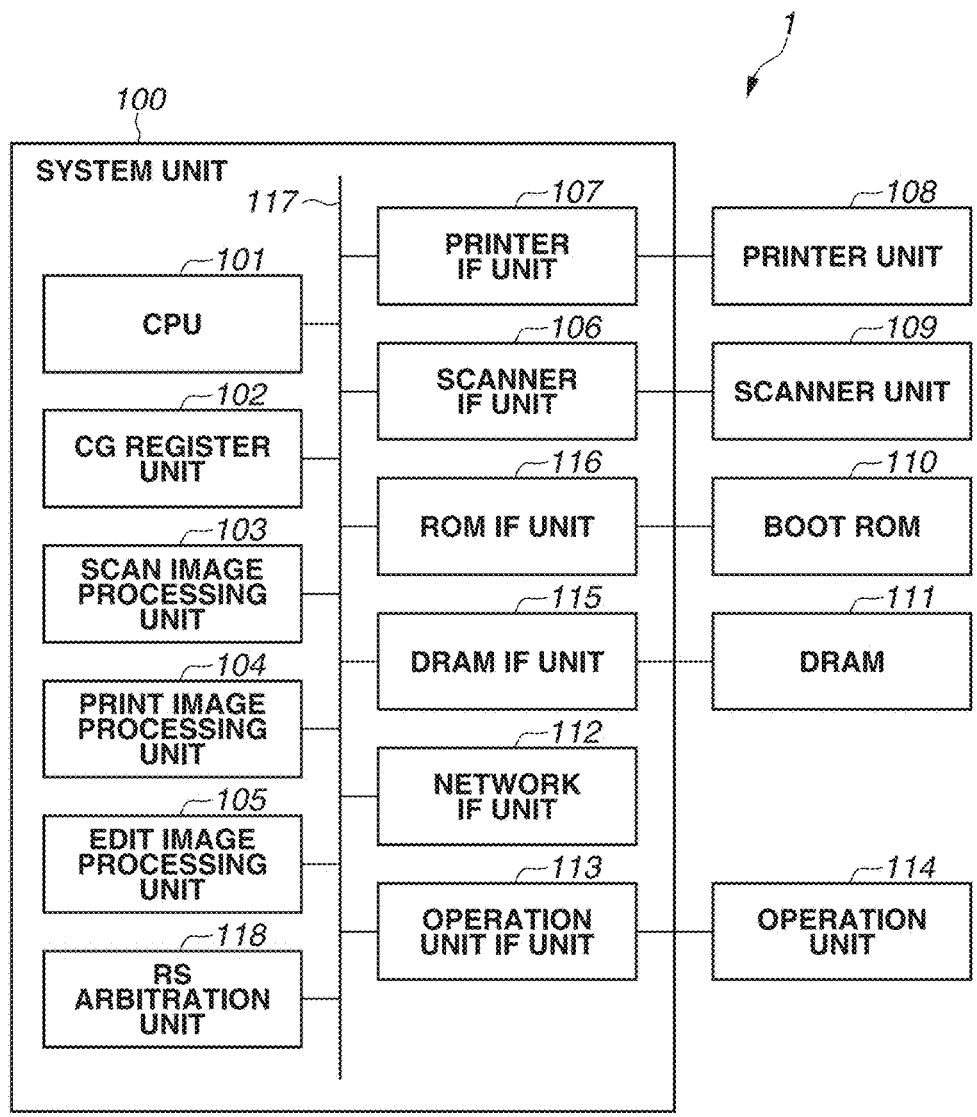
FIG. 1 is a block diagram illustrating an entire system.

FIG. 1 is a block diagram illustrating an entire system. An MFP 1 includes a system unit 100, a printer unit 108, a scanner unit 109, a boot read only memory (ROM) 110, a dynamic random access memory (DRAM) 111, and an operation unit 114.

The system unit 100 includes a central processing unit (CPU) 101, a clock gating (CG) register unit 102, a scan image processing unit 103, a print image processing unit 104, and an edit image processing unit 105. The system unit 100 further includes a scanner interface (IF) unit 106, a printer IF unit 107, a network IF unit 112, an operation unit IF unit 113, a DRAM IF unit 115, and an ROM IF unit 116.

The printer unit 108 is an image output device and the scanner unit 109 is an image input device. The system unit 100 and the printer unit 108 are connected to each other via the printer IF unit 107. The system unit 100 and the scanner unit 109 are connected to each other via the scanner interface IF unit 106. The system unit 100 controls the printer unit 108 and the scanner unit 109 to perform reading and printing of image data. The units in the system unit 100 are communicably connected to each other via a bus 117.

The CPU 101 controls the units in the system unit 100. The CPU 101 runs an operating system (OS) and an application program loaded on the DRAM 111. For example, the CPU 101 performs control so that image data input from the scanner unit 109 is output to the printer unit 108, whereby the copy function is performed. In the present exemplary embodiment, the CPU 101 performs control by setting a value of the CG register unit 102, so that a clock signal used by the scan image processing unit 103, the print image processing unit 104, and the edit image processing unit 105 is supplied and stopped.

The CG register unit 102 includes a register for performing control such that the clock signal used by the scan image processing unit 103 is supplied and stopped, and a register for performing control such that the clock signal used by the print image processing unit 104 is supplied and stopped. The CG register unit 102 further includes a register for performing control such that the clock signal used by the edit image processing unit 105 is supplied and stopped. Values of the registers of the CG register unit 102 are rewritable by the CPU 101. The system unit 100 is operated with a clock signal at a frequency multiplied in a phase locked loop (PLL) and the like (not illustrated). The scan image processing unit 103, the print image processing unit 104, and the edit image processing unit 105 are also operated with the clock signal.

The scan image processing unit 103 executes various types of image processing under control of the CPU 101. More specifically, the scan image processing unit 103 is a circuit that executes various types of processing, such as correction, modifying, and blank page determination, on the image data obtained by the scanner unit 109 through reading. The print image processing unit 104 executes various types of image processing under control of the CPU 101. More specifically, the print image processing unit 104 is a circuit that executes various types of processing, such as image processing correction and binary conversion on the image data to be output by printing, in accordance with the configuration of the printer unit 108. The edit image processing unit 105 executes various types of image processing under control of the CPU 101. More specifically, the edit image processing unit 105 executes various types of image processing such as rotation, scaling, color processing, trimming, masking, binary conversion, and conversion into a multi binary image on the image data.

The ROM IF unit 116 is an interface module used for accessing the boot ROM 110. When the system unit 100 is turned ON, the CPU 101 accesses the boot ROM 110 via the ROM IF unit 116, and executes a boot program within the boot ROM 110.

The DRAM IF unit 115 is an interface module used for accessing the DRAM 111. The DRAM IF unit 115 includes a register that is used for setting and controlling the DRAM 111, and can be accessed by the CPU 101.

The operation unit IF unit 113 receives an operation instruction issued by a user through the operation unit 114, and displays an operation result on the operation unit 114.

The network IF unit 112 is a local area network (LAN) card and the like, and connected to a network (not illustrated) such as a LAN to transmit and receive device information and image data to and from external devices.

Figure 2:
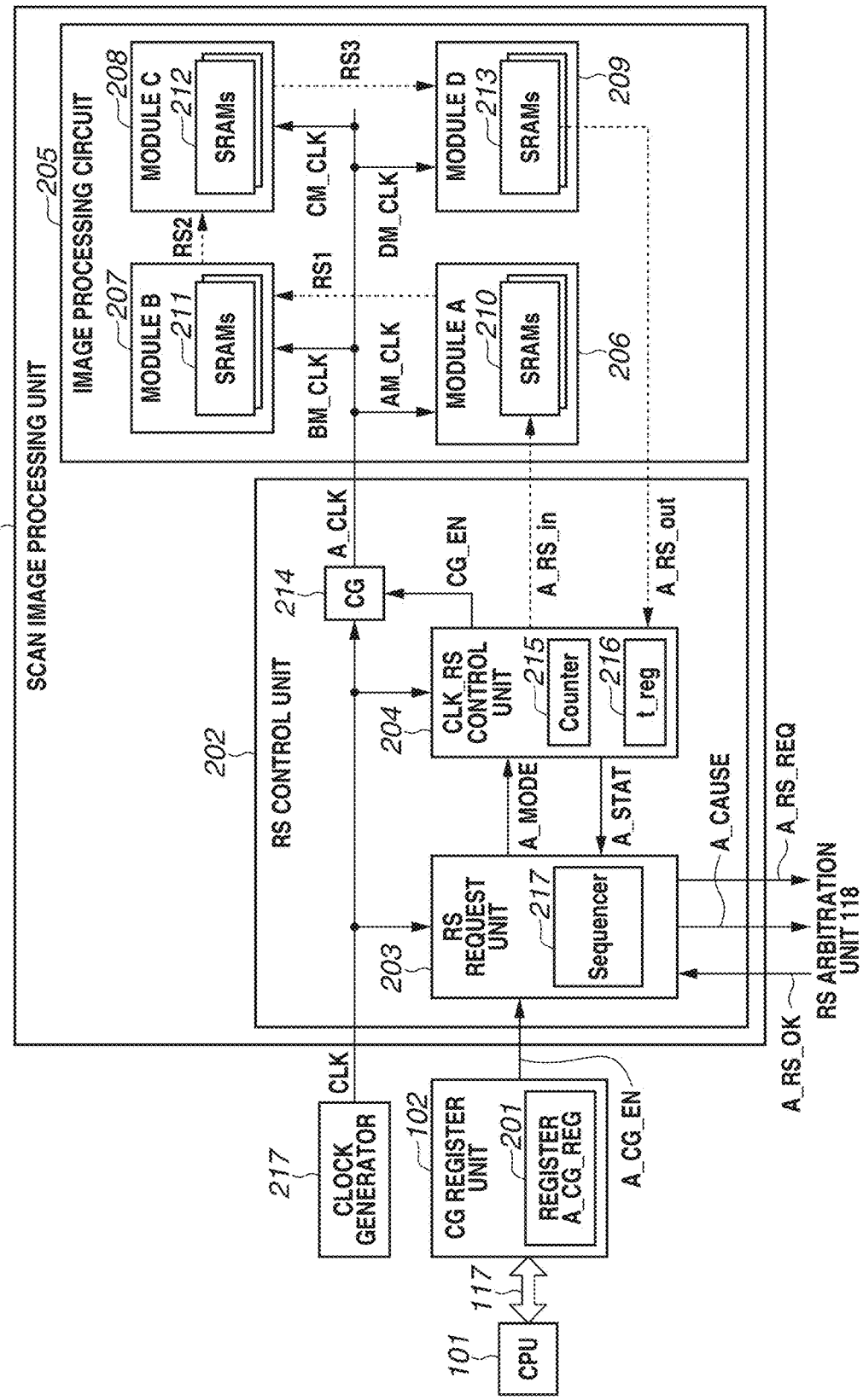
FIG. 2 is a block diagram illustrating a scan image processing unit.

FIG. 2 is a block diagram illustrating the scan image processing unit 103.

The CPU 101 accesses the CG register unit 102 via the bus 117. The CG register unit 102 includes a register A_CG_REG 201. The register A_CG_REG 201 outputs a signal (A_CG_EN) for controlling a clock signal (A_CLK) input to an image processing circuit 205 in accordance with a value written by the CPU 101. Thus, whether the clock signal (A_CLK) input to the image processing circuit 205 is supplied or stopped is controlled by the value written by the CPU 101 to the register A_CG_REG 201.

The scan image processing unit 103 includes a resume-standby (RS) control unit 202 and the image processing circuit 205.

The RS control unit 202 includes an RS request unit 203, a CLK_RS control unit 204, and a CG cell 214. The RS control unit 202 controls an operation mode of a static random access memory (SRAM) provided in the image processing circuit 205. The RS control unit 202 performs control so that a clock signal to the SRAM is supplied or stopped. The SRAM according to the present exemplary embodiment enters a standby state and a resume state which consumes lower power than the standby state.

The RS request unit 203 includes a sequencer 217. The sequencer 217 is a state machine that controls an output of an A_RS_REQ signal based on the A_CG_EN signal output from the register A_CG_REG 201. The A_RS_REQ signal is output to an RS arbitration unit (arbitration circuit) 118. The sequencer 217 controls an output of an A_MODE signal, based on an A_RS_OK signal output from the RS arbitration unit 118.

The CLK_RS control unit 204 includes a counter 215 and a register t_reg 216. The counter 215 is a counter circuit. The counter 215 is provided to adjust the output timing of an A_RS_in signal for instructing the SRAM to transition to the resume state. The counter 215 is adjusted such that the A_RS_in signal is output when a predetermined period of time has elapsed after a CG_EN signal is output from the CLK_RS control unit 204.

The CPU 101 can rewrite the value of the register t_reg 216. The register t_reg 216 indicates time that elapses after the CG_EN signal is output from the CLK_RS control unit 204 until the A_RS_1 in signal is output. An A_STAT signal indicates whether the SRAM of the scan image processing unit 103 is in the resume state or in the standby state.

The CG cell 214 outputs a clock signal (CLK) which is output from a clock generator 217, as the clock signal (A_CLK) to the image processing circuit 205. The CG cell 214 performs control such that the A_CLK signal is supplied or stopped in accordance with the CG_EN signal. The clock generator 217 generates the clock single (CLK) which is supplied to the scan image processing unit 103.

The image processing circuit 205 is a circuit that executes image processing and includes a module A 206, a module B 207, a module C 208, and a module D 209. The number of the modules, which is four in the description in the present exemplary embodiment, can be larger or smaller than four. While the single image processing circuit 205 is described in the present exemplary embodiment, it does not rule out the configuration including a plurality of circuits such as the image processing circuit 205.

The module A, the module B, the module C, and the module D respectively include SRAM blocks 210, 211, 212, and 213. Each block includes a plurality of SRAMs.

The configuration of the print image processing unit 104 is the same as that of the scan image processing unit 103 described above, and thus the description thereof is omitted.

Figure 3:
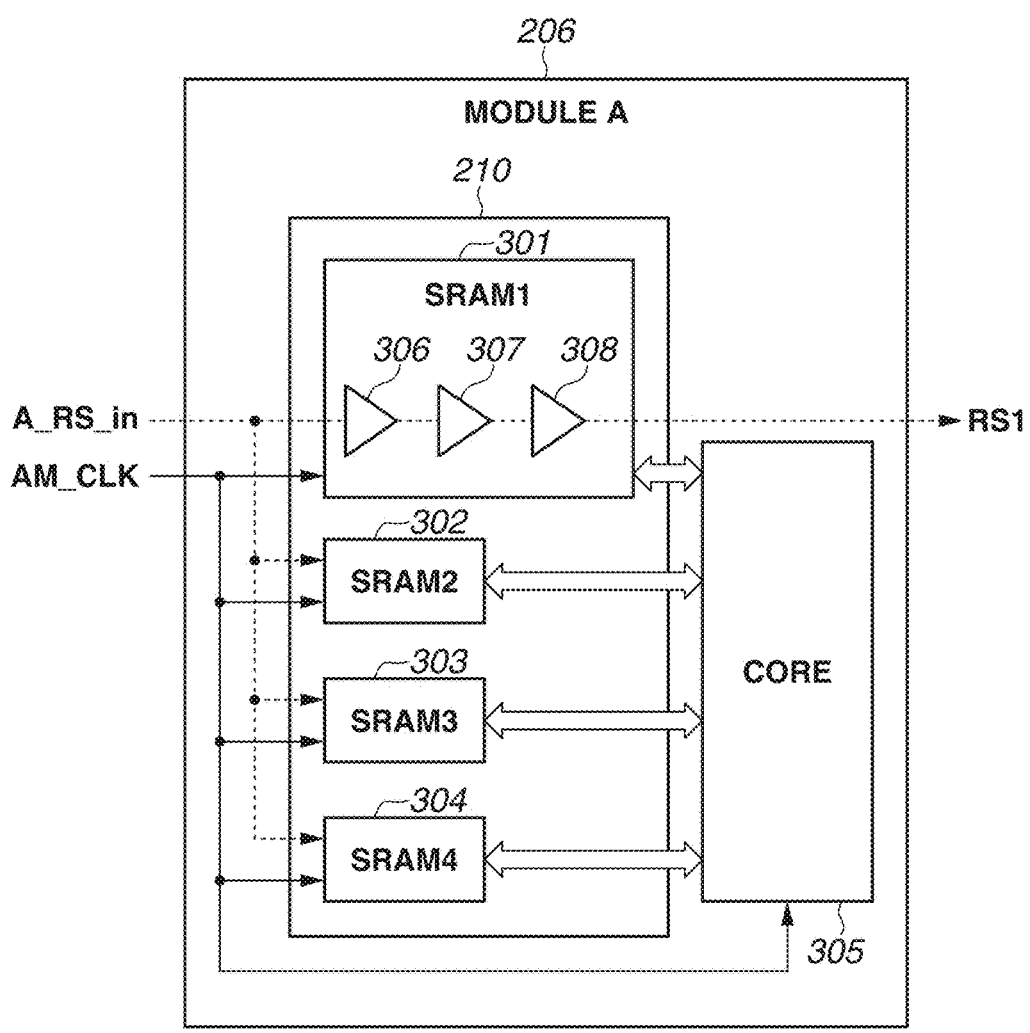
FIG. 3 is a block diagram illustrating a module A.

FIG. 3 is a block diagram illustrating the module A. The configurations of the modules B, C, and D are the same as that of the module A, and thus the description thereof is omitted.

The module A includes the SRAM block 210 and a core 305. The SRAM block 210 includes an SRAM1 301, an SRAM2 302, an SRAM3 303, and an SRAM4 304 that are connected to the core 305 as an image processing circuit.

The A_RS_in signal, represented by dashed line in FIG. 3, is an input signal to the module A, and is input to each of the SRAM1 301 to the SRAM4 304. The SRAM1 301 to the SRAM4 304 transition to the resume state when the A_RS_in signal is High. Thus, the SRAM1 301 to the SRAM4 304 can transition between the standby state and the resume state in accordance with the A_RS_in signal. The SRAM1 301 to the SRAM4 304 transition to the resume state to achieve a power saving state. An AM_CLK signal is an input signal to the module A, and is a clock signal input to the SRAM1 301 to SRAM4 304 and the core 305.

A RS1 signal is an output signal from the module A. The RS1 signal is the A_RS_in signal input to the SRAM1 301 and delayed by buffer cells 306 to 308. The RS1 signal is generated by the SRAM that has the largest storage capacity in the SRAM block 210. In the present exemplary embodiment, since the SRAM1 301 has a larger storage capacity than the SRAM2 302 to the SRAM4 304, the SRAM1 301 outputs the RS1 signal.

The scale of the storage capacity of the SRAM has a correlation with the time required for transitioning to or returning from the resume state. Thus, the delay time is generated by the buffer cells or the like such that the larger a storage capacity, the longer a time until outputting the RS signal. This is because if an SRAM has a larger storage capacity, a scale of memory array portion and peripheral circuit constituting the SRAM becomes larger. Thus, it takes long time until a power supply and a signal node are stabilized within the SRAM to enable the memory array portion and the peripheral circuit to operate. Thus, the A_RS_in signal input to the module A is output as the RS1 signal after the stabilization of the power supply and the like is achieved.

Figure 4:
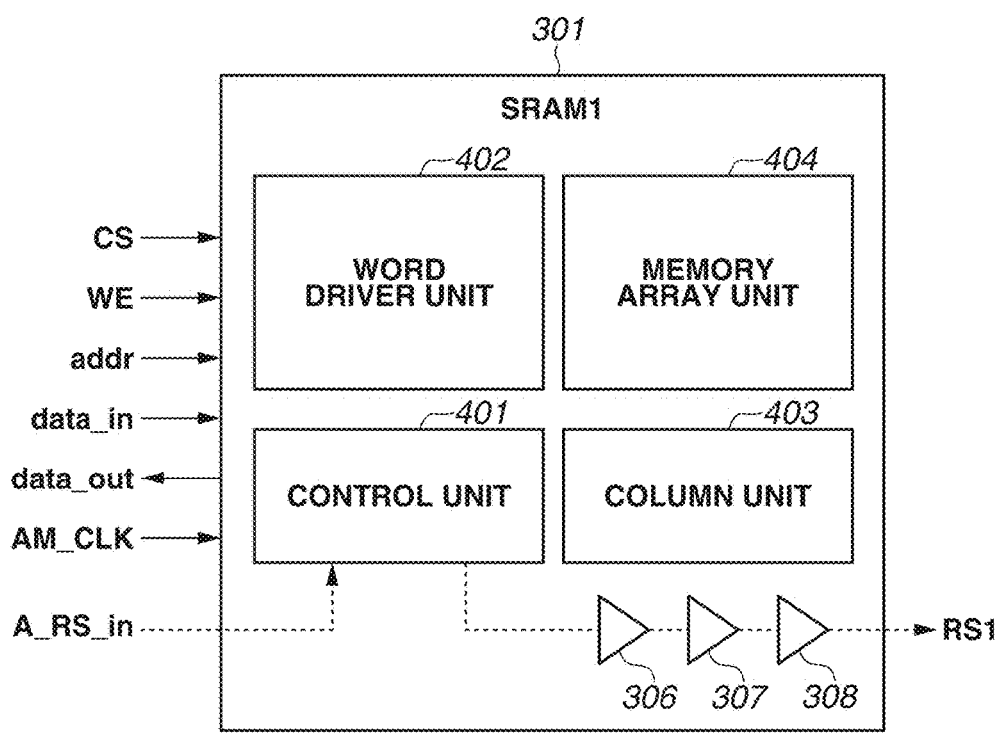
FIG. 4 is a block diagram of a static random access memory (SRAM).

FIG. 4 is a block diagram illustrating a configuration of an SRAM with the SRAM1 301 as an example. The configurations of the SRAM2 302, the SRAM3 303 and the SRAM4 304 are the same as that of the SRAM1 301, and thus the description thereof will be omitted. The SRAM1 301 receives input signals CS (chip select), WE (write enable signal), addr (address signal), data in, the AM_CLK and A_RS_in, and output signals are data_out and the RS1.

A control unit 401 includes a timing control circuit that generates a timing signal for a memory operation from the signal CS and the signal WE. The control unit 401 controls power supply to a word driver unit 402 and a column unit 403 in accordance with the A_RS_in signal. More specifically, the control unit 401 includes a circuit that cuts off the power supply to the word driver unit 402 and the column unit 403 when the A_RS_in signal is High. The power supply to portions for which the A_RS_in signal is not controlled by the control unit 401 may be cut off when the A_RS_in signal is High. As described above, the A_RS_in signal is delayed by the control unit 401 and the buffer cells 306 to 308 to be output as the RS1 signal.

The word driver unit 402 is a block which decodes the addr signal, and determines a row to be activated in a memory array unit 404. In the resume state, the power supply to the word driver unit 402 is cut off.

The column unit 403 is a block which decodes the addr signal and determines a column to be activated in the memory array unit 404. In the resume state, the power supply to the column unit 403 is cut off.

In the present exemplary embodiment, cut-off of power supply to the word driver unit 402 and the column unit 403 and oscillation of the clock signal do not occur concurrently when the transition to the resume state occurs. Accordingly, voltage fluctuation in the memory array unit 404 can be prevented.

In the memory array unit 404, static memory cells are arranged in a matrix, and data is stored in a memory cell determined by the word driver unit 402 and the column unit 403. The power is supplied to the memory array unit 404 even in the resume state, and thus the memory array unit 404 can hold the data also in the resume state.

In FIG. 2, the RS1 signal output from the module A is input into the module B, and is output as a RS2 signal from an SRAM having the largest storage capacity in the SRAM block 211. The RS2 signal is input into the module C. Similarly, an RS3 signal is output from the module C to be input into the module D. The RS3 signal finally input into the module D is output as an A_RS_out signal and input into the CLK_RS control unit 204. As described above, the RS signal is sequentially input into the modules A to D through a daisy chain connection.

Figure 5:
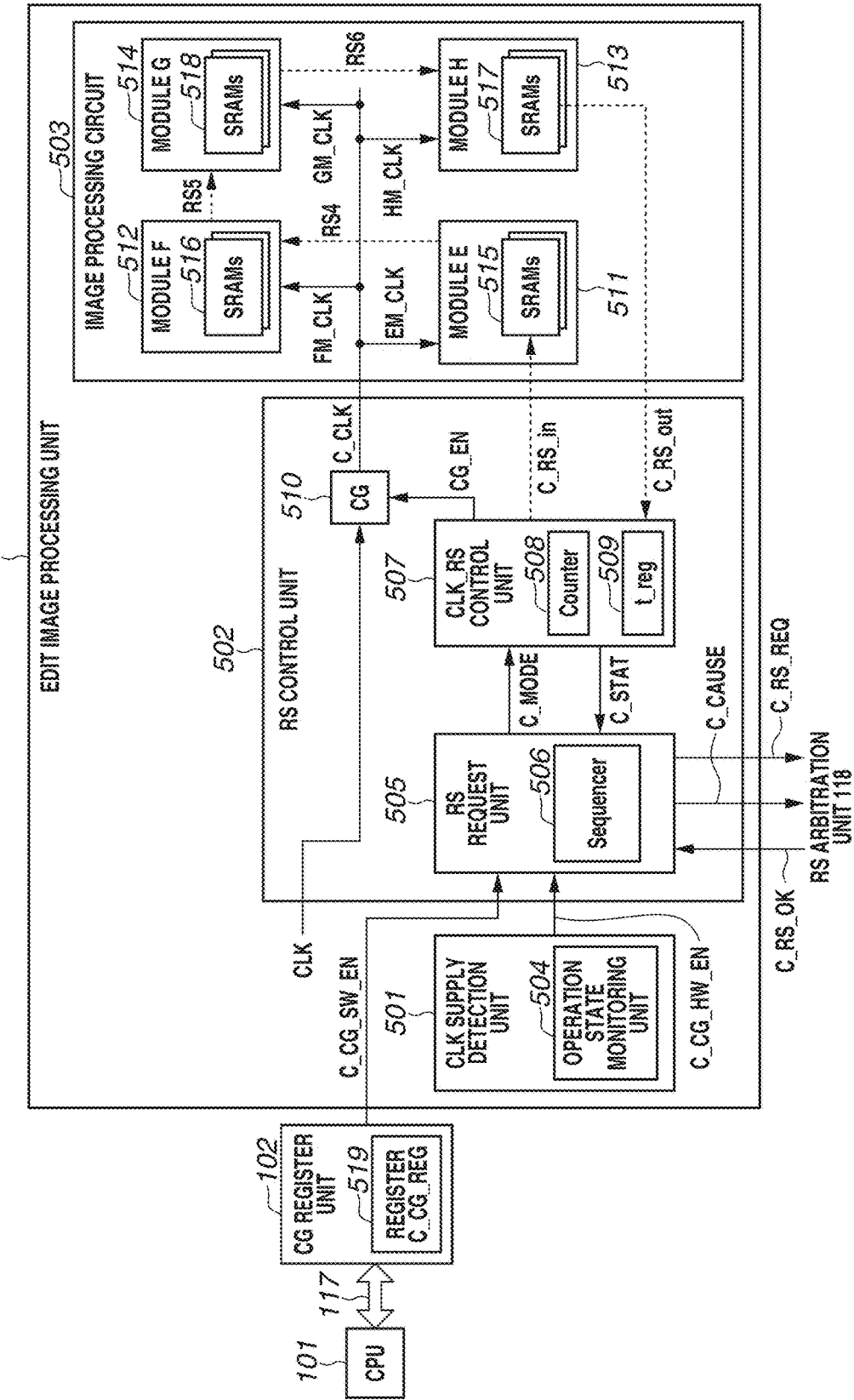
FIG. 5 is a block diagram illustrating an edit image processing unit.

FIG. 5 is a block diagram illustrating the edit image processing unit 105.

The CPU 101 accesses the CG register unit 102 via the bus 117. The CG register unit 102 includes a register C_CG_REG 519. The register C_CG_REG 519 outputs a signal (C_CG_SW_EN) for controlling a clock signal (C_CLK) input into an image processing circuit 503 in accordance with a value written by the CPU 101. More specifically, whether the clock signal (C_CLK) input into the image processing circuit 503 is supplied or stopped is controlled in accordance with the value written to the register C_CG_REG 519 by the CPU 101.

The edit image processing unit 105 includes a CLK supply detection unit 501, an RS control unit 502, and the image processing circuit 503.

The CLK supply detection unit 501 includes an operation state monitoring unit 504. The operation state monitoring unit 504 monitors an operation state of the image processing circuit 503, that is, determines whether the image processing circuit 503 is operating based on an operation start signal (for example, an enable signal) and an operation complete signal (for example, a status signal), (both not illustrated). When the operation is being performed, a C_CG_HW_EN signal is set Low to perform control such that transition to the standby state is carried out. When the operation is completed, the C_CG_HW_EN signal is set High to perform control such that transition to the resume state is carried out.

Two signals (the C_CG_SW_EN signal and the C_CG_HW_EN signal) that trigger the transition to the resume state are input into the RS control unit 502 in contrast to the RS control unit 202 of the scan image processing unit 103.

The RS control unit 502 includes an RS request unit 505, a CLK_RS control unit 507, and a CG cell 510. Difference from the RS control unit 202 is described below.

A sequencer 506 of the RS request unit 505 controls an output of a C_RS_REQ signal based on the C_CG_SW_EN signal or the C_CG_HW_EN signal. The sequencer 506 outputs a C_CAUSE signal to the RS arbitration unit 118 when the C_RS_REQ signal is set High. The C_CAUSE signal indicates either the C_CG_SW_EN signal or the C_CG_HW_EN signal which serves as the signal that triggers the transition to the resume state. In the present exemplary embodiment, the C_CAUSE signal is set High when the C_CG_HW_EN signal serves as the signal that triggers the transition to the resume state, and is set Low when the C_CG_SW_EN signal serves as the signal that triggers the transition to the resume stat. On the other hand, in the scan image processing unit 103, only the trigger (A_CG_EN signal) based on the setting of the register which the CPU 101 makes is provided, and thus an A_CAUSE signal constantly stays Low.

Figure 6:
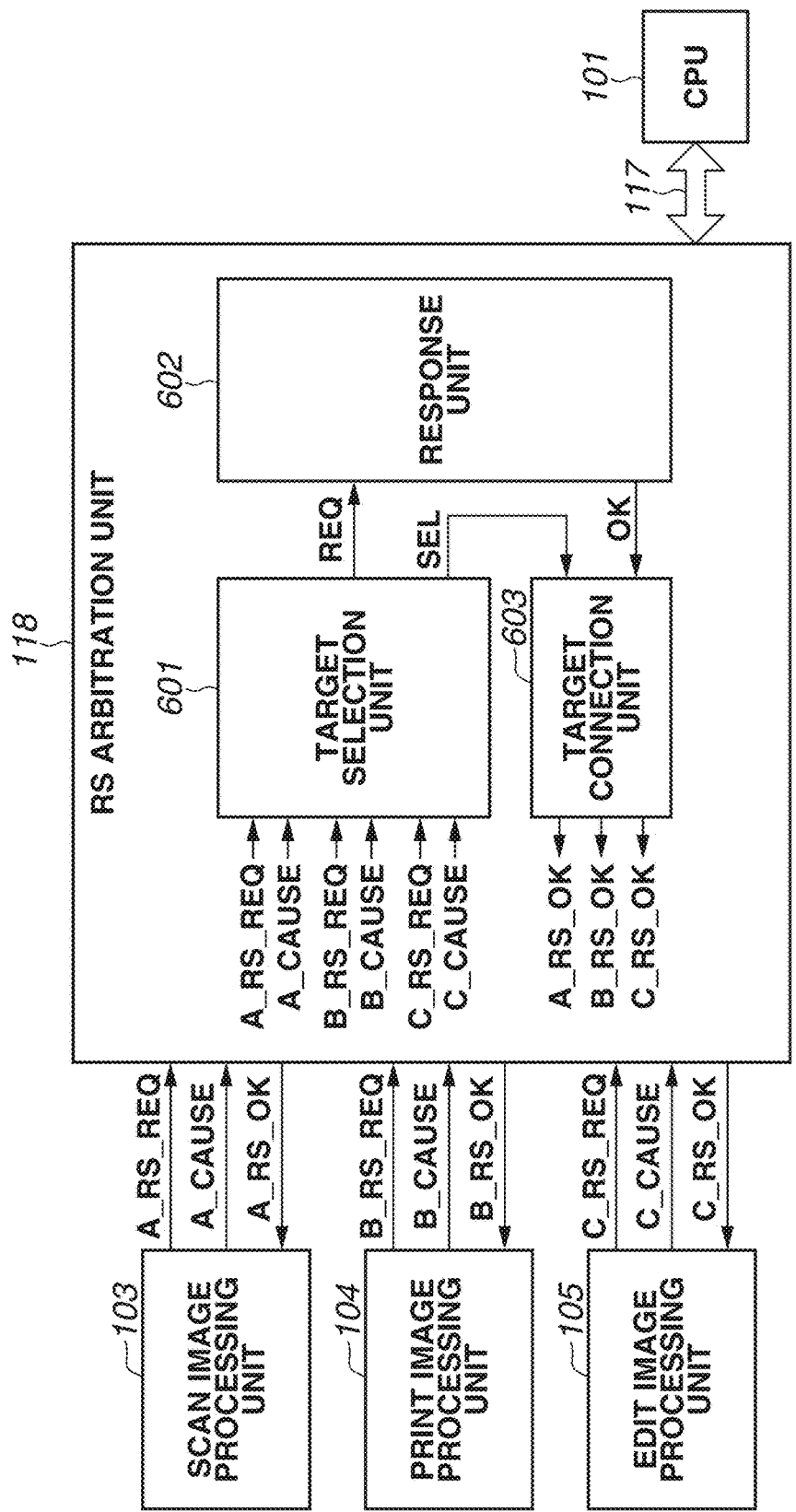
FIG. 6 is a block diagram of a resume-standby (RS) arbitration unit.

FIG. 6 is a block diagram illustrating the RS arbitration unit 118 in detail.

The RS arbitration unit 118 receives an RS_REQ signal from the RS request unit (203 or 505) provided in each image processing unit 103 or 105, and returns an RS_OK signal to any one of RS request units provided in a plurality of image processing units. In other words, under control of the RS arbitration unit 118, the transition to the resume state is simultaneously made by the RS control unit in one of image processing units.

The RS arbitration unit 118 includes a target selection unit 601, a response unit 602, and a target connection unit 603.

The target selection unit 601 receives the RS_REQ signal (A_RS_REQ and C_RS_REQ) and the CAUSE signal (A_CAUSE and C_CAUSE) from each RS request unit, and determines the RS request unit that executes the transition to the resume state. The RS request unit thus determined is indicated by a SEL signal. The target selection unit 601 ORs the RS_REQ signals received from the RS request units, and generates a REQ signal indicating the RS_REQ signal which is High.

The response unit 602 receives the REQ signal and returns an OK signal via a flip-flop. Thus, the OK signal is generated.

The target connection unit 603 connects the OK signal to the RS_OK signal determined based on the SEL signal. For example, when the SEL signal indicates A, the OK signal is connected to an A_RS_OK signal, and a B_RS_OK signal and a C_RS_OK signal that are not connected to the OK signal stay Low.

FIG. 7 illustrates a truth table of the target selection unit 601.

In the truth table, each RS_REQ and each CAUSE represent an input signal to the target selection unit 601. The SEL signal is an output signal from the target selection unit 601 determined based on the input signal. A condition placed at a higher position is given a higher priority. FIG. 7 shows that the SEL signal indicates A when both the A_RS_REQ signal and the A_CAUSE signal are High. The values of the SEL signals after this are determined in a similar manner. In the truth table, the sign "–" represents Don't Care. Thus, the RS_REQ signal corresponding to a CAUSE signal that is High is preferentially selected as the target. When none of the RS_REQ signals is High, the SEL signal indicates NONE.

Figure 8:
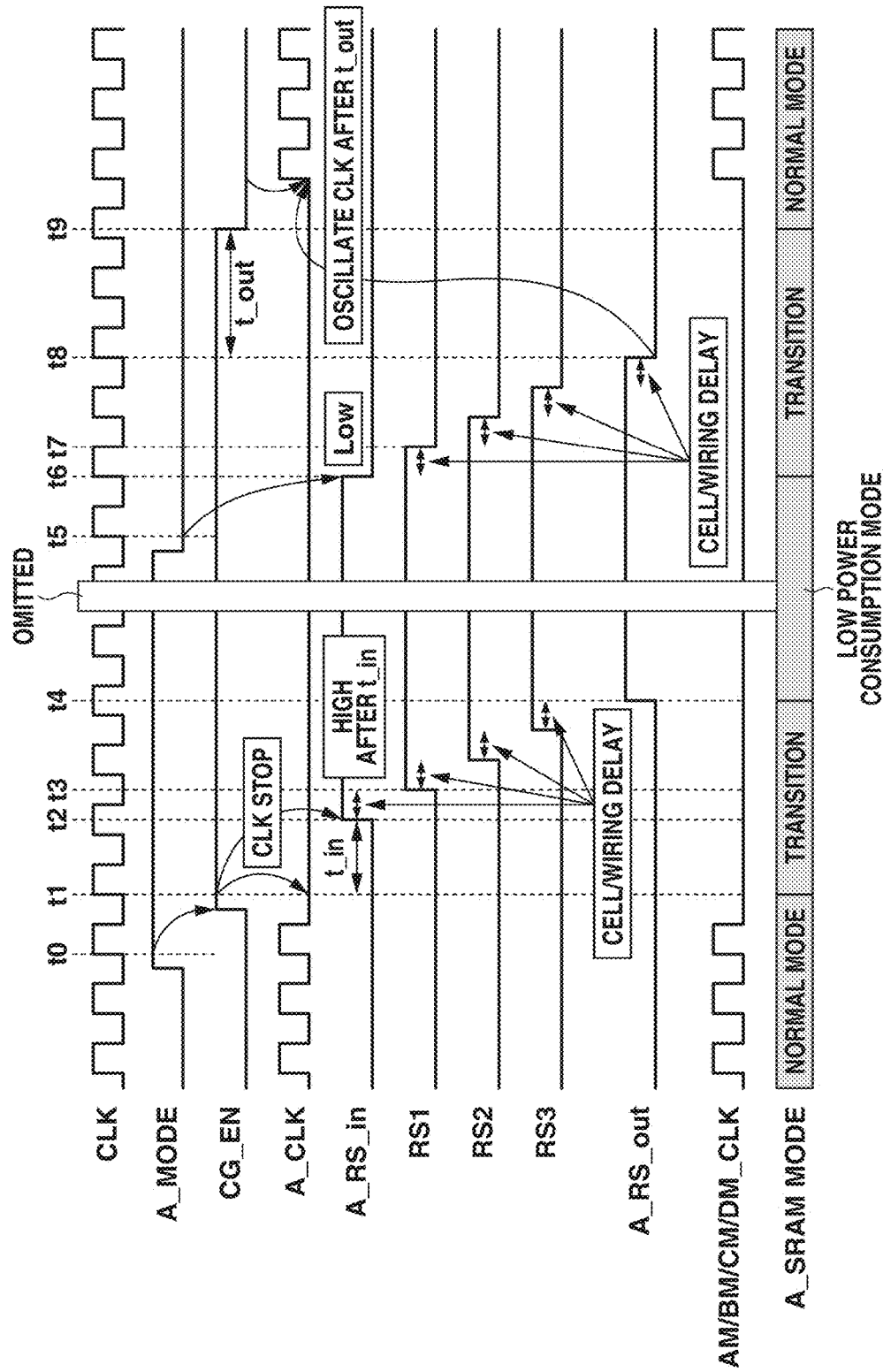
FIG. 8 is a timing chart illustrating timings at which clock and control signals are output.

FIG. 8 is a timing chart illustrating timings at which the clock and the control signals are output.

The CLK signal which is an operation clock for the scan image processing unit 103 is output from the clock generator 217, and is always oscillated after the system unit 100 is turned ON.

First, a sequence in which the SRAM blocks 210 to 213 transition to the resume state is described.

At a time point t0, the RS request unit 203 sets the A_MODE signal High which indicates the transition to the resume state. The RS request unit 203 sets the A_MODE signal High when a permission to transition to the resume state (the A_RS_OK signal is High) is received from the RS arbitration unit 118.

At a time point t1, when the A_MODE signal becomes High, the CLK_RS control unit 204 sets the CG_EN signal High. When the CG_EN signal becomes High, the CG cell 214 stops the A_CLK signal (clock stop state). Hence, supply of the AM_CLK, BM_CLK, CM_CLK, and DM_CLK signals in the image processing circuit 205 are stopped, and supply of the clock signal to the SRAMs in the image processing circuit 205 is stopped.

At the time point t1, the CG_EN signal is set High and the supply of the A_CLK signal is stopped. The CLK_RS control unit 204 sets the A_RS_in signal High at a time point t2 after a time t_in has elapsed from the time point t1. Hence, the clock signal to be input to the SRAM is stopped when the SRAM transitions to the resume state, so that the power supply voltage is prevented from fluctuating due to clock toggling.

The appropriate time t_in depends on the storage capacity of the SRAM. The time becomes longer as the storage capacity becomes larger. Thus, the time t_in is adjusted by the register t_reg 216 such that the time appropriate for the storage capacity of the SRAM can be set.

When, the A_RS_in signal is set High at the time point t2, the RS1 signal becomes High at a time point t3 due to a cell/wiring delay. Similarly, when the RS1 signal becomes High, after the cell/wiring delay, the RS2 signal becomes High. When the RS2 signal becomes High, after the cell/wiring delay, the RS3 signal becomes High. When the RS3 signal becomes High, after the cell/wiring delay, the A_RS_out signal becomes High at a time point t4. Thus, all the SRAMs in the image processing circuit 205 transition to the resume state.

Next, a sequence in which the SRAM returns from the resume state is described.

The RS request unit 203 sets the A_MODE signal Low which indicates the standby state before a time point t5. The A_MODE signal is set Low at timing that a permission to transition to the standby state is received from the RS arbitration unit 118 under control of the RS request unit 203.

When the A_MODE signal becomes Low, the CLK_RS control unit 204 sets the A_RS_in signal to Low at a time point t6. Then, the RS1, RS2, RS3, and A_RS_out signals become Low in this order as in the case of the transition to the resume state. At a time point t9 at which a time t_out has elapsed from a time point t8 at which a P_RS_out signal becomes Low, the CLK_RS control unit 204 sets the CG_EN signal to Low.

The appropriate time t_out depends on the storage capacity of the SRAM, and becomes longer as the storage capacity becomes larger. Hence, the time t_out is adjusted by the register t_reg 216, so that time appropriate for the storage capacity of the SRAM can be set.

When the CG_EN signal becomes Low, the CG cell 214 oscillates the A_CLK signal, whereby the SRAM in the image processing circuit 205 transitions from the resume state to the standby state.

Figure 9:
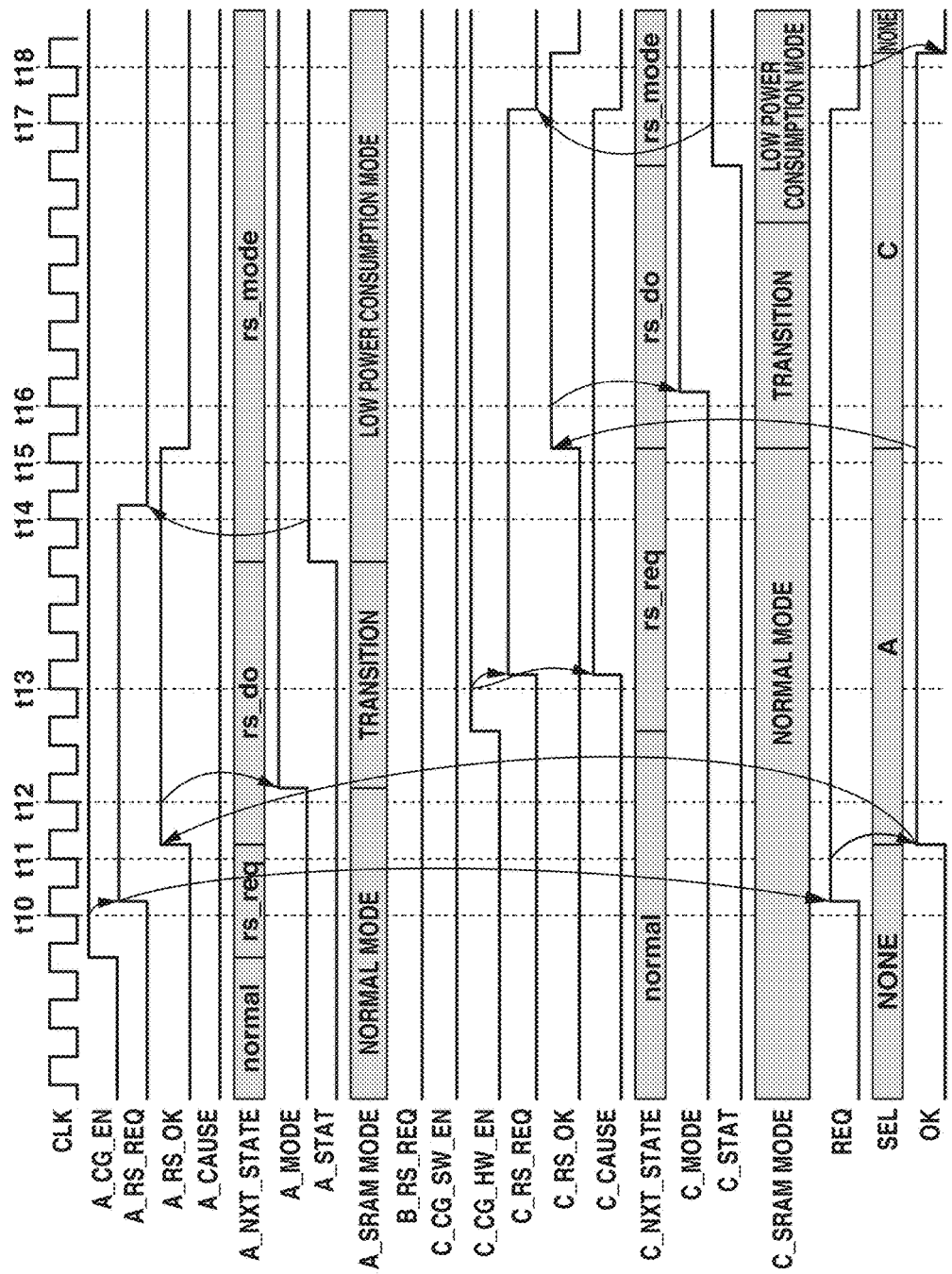
FIG. 9 is a timing chart illustrating a timing at which transition to a resume state is permitted by the RS arbitration unit.

Next, how the RS arbitration unit 118 adjusts the transition of each image processing unit to the resume state is described with reference to FIG. 9.

Before the time point t10, the CPU 101 accesses the register A_CG_REG 201 of the CG register unit 102 via the bus 117, and sets the A_CG_EN signal to High which indicates that supply of the clock signal is to be stopped. More specifically, the CPU 101 accesses the register A_CG_REG 201 when the software determines that the image processing circuit 205 is in an unused state.

At the time point t10, the RS request unit 203 detects that the A_CG_EN signal is High (the sequencer 217 has transitioned to an rs_req state), and sets the A_RS_REQ signal High to issue a request for transition to the resume state to the RS arbitration unit 118. When the A_RS_REQ signal is High, the REQ signal of the RS arbitration unit 118 is set High.

At a time point t11, the target selection unit 601 detects that the REQ signal is High, and determines the SEL signal based on the truth table illustrated in FIG. 7. The SEL signal indicates A because only the A_RS_REQ signal is High. The response unit 602 sets the OK signal High because the REQ signal is High. Further, the target connection unit 603 sets the A_RS_OK signal High, based on the values of the SEL signal and the OK signal.

At a time point t12, the RS request unit 203 detects that the A_RS_OK signal is High (the sequencer 217 has transitioned to an rs_do state), and sets the A_MODE signal High. Thus, the transition to the resume state starts in the scan image processing unit 103 as described above with reference to FIG. 8.

At a time point t13, the RS request unit 505 detects that the C_CG_HW_EN signal is High (the sequencer 506 has transitioned to an rs_req state), and sets the C_RS_REQ signal High to issue the request for transition to the resume state to the RS arbitration unit 118. The C_CG_HW_EN signal becomes High because the operation state monitoring unit 504 has detected that the operation of the image processing circuit 503 has been completed. Further, the transition to the resume state is triggered by the C_CG_HW_EN signal, so that the RS request unit 505 sets the C_CAUSE signal High.

However, the target connection unit 603 does not set the C_RS_OK signal High because the transition to the resume state is in process in the scan image processing unit 103.

At a time point t14, the RS request unit 203 detects that the A_STAT signal is High (the sequencer 217 has transitioned to an rs_mode state), and sets the A_RS_REQ signal Low to issue a notification indicating that the transition to the resume state has been completed to the RS arbitration unit 118.

At a time point t15, the target selection unit 601 detects that the A_RS_REQ signal determined by the SEL signal has become Low, and determines the SEL signal again based on the truth table illustrated in FIG. 7. This time, the SEL signal indicates C because only the C_RS_REQ signal is High. Further, the target connection unit 603 sets the A_RS_OK signal to Low and sets the C_RS_OK signal to High, based on the values of the SEL signal and the OK signal.

At a time point t16, the RS request unit 505 detects that the C_RS_OK signal is High (the sequencer 506 has transitioned to the rs_do state), and sets a C_MODE signal High. Thus, the transition to the resume state starts in the edit image processing unit 105.

At a time point t17, the RS request unit 505 detects that a C_STAT signal is High (the sequencer 506 has transitioned to the rs_mode state), and sets the C_RS_REQ signal Low to issue a notification indicating that the transition to the resume state has been completed, to the RS arbitration unit 118.

At a time point t18, the target selection unit 601 detects that the C_RS_REQ signal determined by the SEL signal has become Low, and determines the SEL signal again. This time, the SEL signal indicates NONE. The response unit 602 sets the OK signal Low because the REQ signal has become Low.

Figure 10:
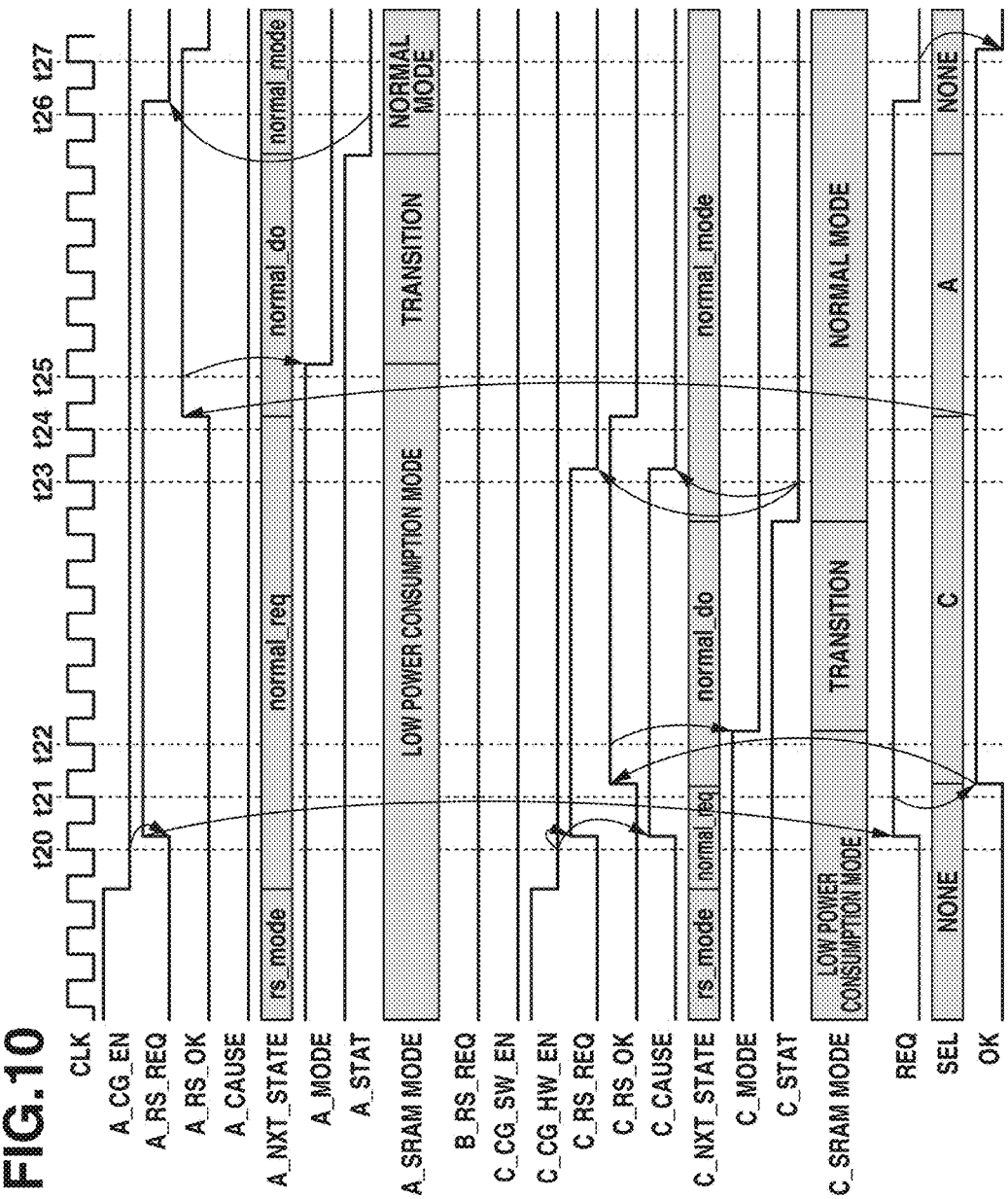
FIG. 10 is a timing chart illustrating a timing at which transition to a standby state is permitted by the RS arbitration unit.

Next, how the RS arbitration unit 118 adjusts transition to the standby state of each RS request unit is described with reference to FIG. 10.

Before a time point t20, the CPU 101 accesses the register A_CG_REG 201 of the CG register unit 102 via the bus 117 and sets the A_CG_EN signal to Low which indicates that the clock signal is supplied. The CPU 101 accesses the register A_CG_REG 201 at a timing that the CPU 101 determines to use the image processing circuit 205. At the same timing, the operation state monitoring unit 504 has detected that the operation of the image processing circuit 503 has started, and thus has set the C_CG_HW_EN signal to Low.

At the time point t20, the RS request unit 203 detects that the A_CG_EN signal is Low (the sequencer 217 has transitioned to a normal_req state), and sets the A_RS_REQ signal High. The RS request unit 505 detects that the C_CG_HW_EN signal is Low (the sequencer 506 has transitioned to the normal_req state), and sets the C_RS_REQ signal High. The transition to the resume state is triggered by the C_CG_HW_EN signal, thus the C_CAUSE signal is set High. When the A_RS_REQ signal and the C_RS_REQ signal is set High, the REQ signal is set High.

At a time point t21, the target selection unit 601 detects that the REQ signal is High, and determines the SEL signal based on the truth table illustrated in FIG. 7. In the example illustrated in FIG. 10, while both the A_RS_REQ signal and the C_RS_REQ signal are High, the SEL signal indicates C since the C_CAUSE signal is High. The response unit 602 sets the OK signal High because the REQ signal is High. The target connection unit 603 sets the C_RS_OK signal High based on the values of the SEL signal and the OK signal. Accordingly, the RS request unit 203 waits until the transition of the RS request unit 505 to the standby state is completed.

At a time point t22, the RS request unit 505 detects that the C_RS_OK signal is High (the sequencer 506 has transitioned to a normal do state), and sets the C_MODE signal Low. Thus, the transition to the standby state starts in the edit image processing unit 105.

At a time point t23, the RS request unit 505 detects that the C_STAT signal is Low (the sequencer 506 has transitioned to a normal mode state), and sets the C_RS_REQ signal Low.

At a time point t24, the target selection unit 601 detects that the C_RS_REQ signal determined by the SEL has been set Low, and determines the SEL signal again. This time, the SEL signal indicates A because only the A_RS_REQ signal is High. The target connection unit 603 sets the C_RS_OK signal Low, and sets the A_RS_OK signal High, based on the values of the SEL signal and the OK signal.

At a time point t25, the RS request unit 203 detects that the A_RS_OK signal is High (the sequencer 217 has transitioned to the normal do state), and sets the A_MODE signal Low. Thus, the transition to the standby state starts in the scan image processing unit 103.

At a time point t26, the RS request unit 203 detects that the A_STAT signal is Low (the sequencer 217 has transitioned to the normal mode state) and sets the A_RS_REQ signal Low.

At a time point t27, the target selection unit 601 detects that the A_RS_REQ signal that has been indicated by the SEL signal is Low, and determines the SEL signal again. This time, the SEL signal indicates NONE. The response unit 602 sets the OK signal Low because the REQ signal is Low.

As described above, the RS control unit in each image processing unit issues the request for the transition to the resume state, to the RS arbitration unit, and controls the transition to the resume state upon receiving the permission from the RS arbitration unit. Thus, a plurality of functional modules (a plurality of image processing units) can be prevented from transitioning to the resume state at the same time. The RS control unit issues the request for the transition to the resume state, and at the same time, issues a transition factor to the resume state (whether the transition is triggered by setting the register by the CPU or an instruction of HW from the operation monitoring unit). Thus, the RS arbitration unit can perform control such that the prioritized target of the permission is determined based on a request factor. Accordingly, the order of return from the resume state to the standby state can be determined based on a return factor. In the present exemplary embodiment, the example in which the two requests for transition to the resume state are adjusted, and the example in which the two requests for transition to the standby state are adjusted, are described. However, exemplary embodiments are not limited to these two examples. For example, a request for the transition to the standby state and a request for the transition to the resume state may be adjusted. In this case, a signal (transition target information) output to the RS arbitration unit may be differentiated between the request for the transition to the standby state and the request for the transition to the resume state. Thus, the RS arbitration unit may be set in advance in such a manner that either one of the transition requests is prioritized.

In the first exemplary embodiment, how the transition to the standby state is adjusted among a plurality of modules is described. A second exemplary embodiment is described below.

The MFPs perform two major types of image processing, i.e., engine image processing and edit image processing. The engine image processing is processing which requires real-time handling such as scanning and printing. The edit image processing is executed after hard disk drive (HDD) spooling is carried out. The delay in the engine image processing leads to the delay in the start time of the scanning and printing, which directly affects user waiting time. The delay in the start of the edit image processing does not directly affect the user waiting time compared to the engine image processing. In the second exemplary embodiment, a configuration is described in which the engine image processing is prioritized in the transition to the standby state.

Figure 11:
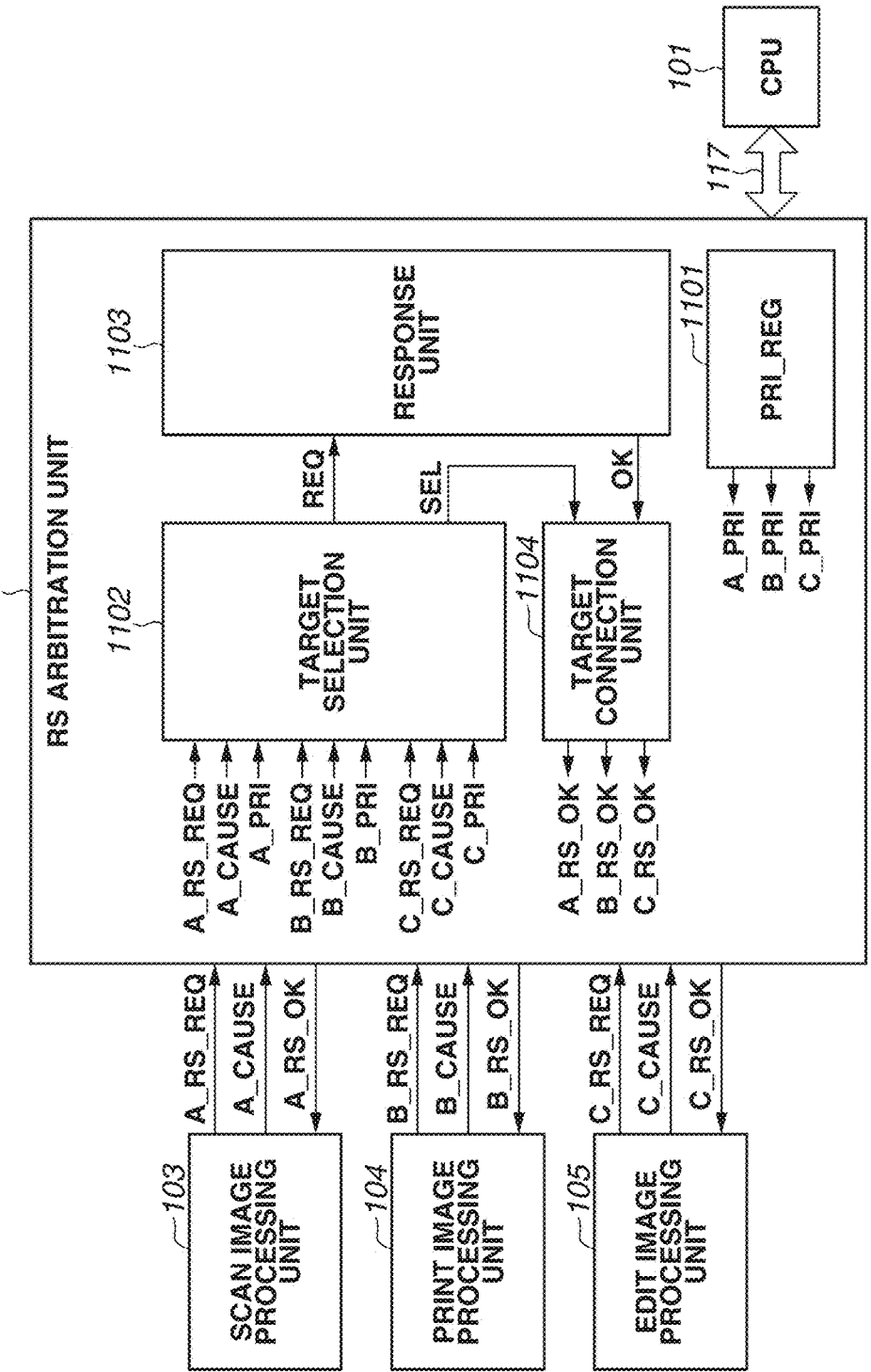
FIG. 11 is a block diagram illustrating an RS arbitration unit according to a second exemplary embodiment.

FIG. 11 is a block diagram illustrating the RS arbitration unit 118 according to the second exemplary embodiment in detail.

The RS arbitration unit 118 according to the second exemplary embodiment is different from the first exemplary embodiment in that a register PRI_REG (priority register) 1101 is further provided. The configuration other than the register PRI_REG 1101 is the same as that in the first exemplary embodiment, and thus the description thereof is omitted.

The register PRI_REG 1101 can be accessed by the CPU 101 and holds information indicating a prioritized image processing unit. More specifically, the register PRI_REG 1101 holds A_PRI, B_PRI, and C_PRI signals. In the present exemplary embodiment, the A_PRI signal indicates the priority of the scan image processing unit 103, the B_PRI signal indicates the priority of the print image processing unit 104, and the C_PRI signal indicates the priority of the edit image processing unit 105. In the second exemplary embodiment, the A_PRI signal and the B_PRI signal respectively corresponding to the scan image processing unit 103 and the print image processing unit 104 which require the real-time handling, are set High indicating that the priority is high. On the other hand, the C_PRI signal corresponding to the edit image processing unit 105 is set Low indicating that the priority is low.

A target selection unit 1102 receives the RS_REQ signal (A_RS_REQ or C_RS_REQ) and the CAUSE signal (A_CAUSE or C_CAUSE) from the RS request units. Further, in the present exemplary embodiment, the target selection unit 1102 further receives the PRI signal (A_PRI, B_PRI, or C_PRI). The target selection unit 1102 selects the RS request unit that issues the permission for transition to the standby state based on the RS_REQ signal, the CAUSE signal, and the PRI signal. A response unit 1103 and a target connection unit 1104 are the same as those in the first exemplary embodiment, and thus the description thereof is omitted.

FIG. 12 is a truth table of the target selection unit 1102.

The truth table in the FIG. 12 has the same configuration as the first exemplary embodiment, in which the A_PRI, B_PRI, and C_PRI signals are further added to the truth table in FIG. 7. In control realized in FIG. 12, the one with each PRI signal set High has the highest priority and next, the one with each CAUSE set High has the second highest priority. In the present exemplary embodiment, the A_PRI and B_PRI signals are High, therefore, response to the request for transition to the standby state of the scan image processing unit 103 and the print image processing unit 104 is prioritized.

Figure 13:
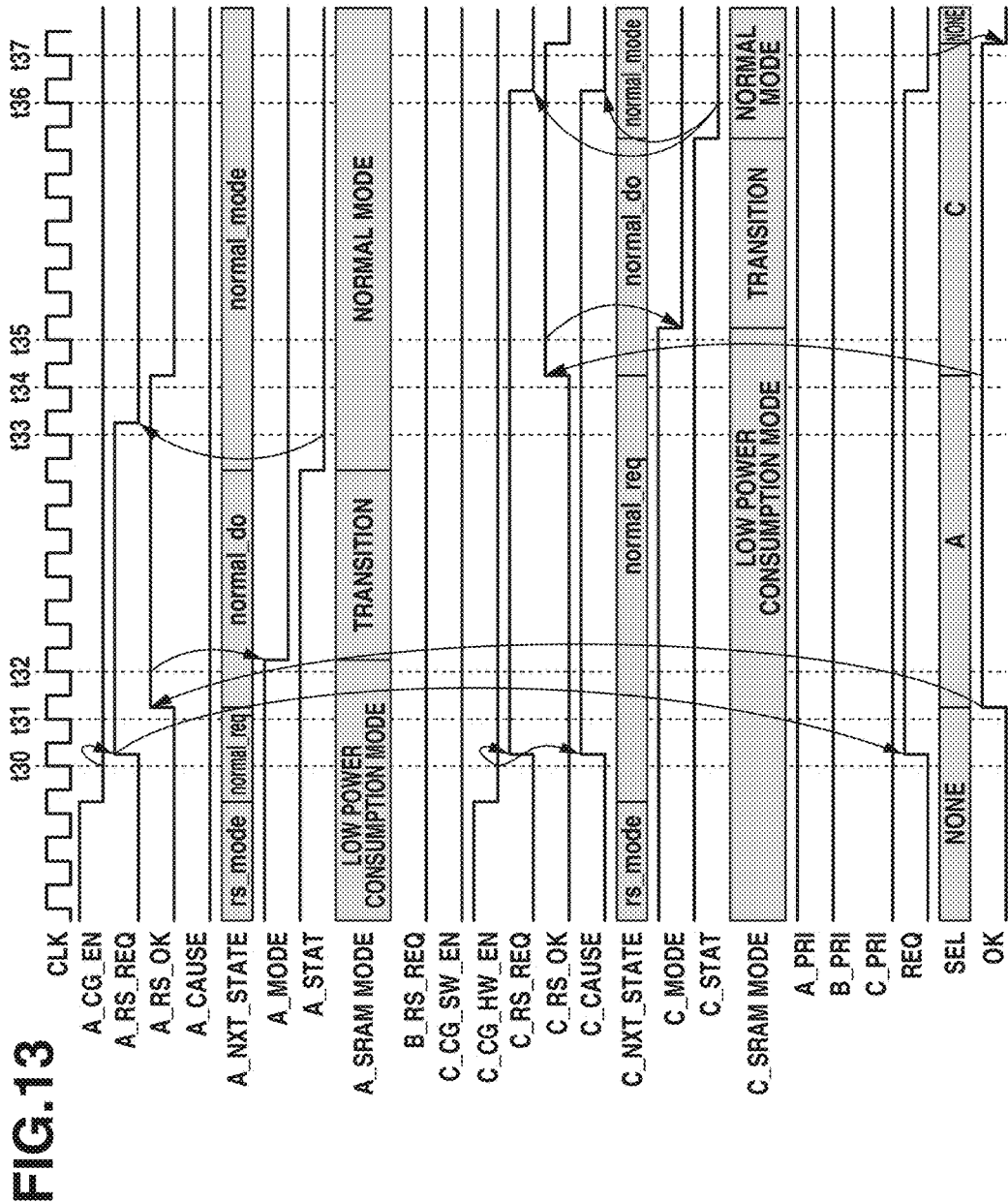
FIG. 13 is a timing chart illustrating a timing at which transition to the standby state is permitted by the RS arbitration unit according to the second exemplary embodiment.

Next, the RS arbitration unit 118 according to the second exemplary embodiment which adjusts the transition of each RS request unit to the standby state is described with reference to FIG. 13.

Before a time point t30, the CPU 101 accesses the register PRI_REG 1101 of the RS arbitration unit 118 via the bus 117 and sets the A_PRI and B_PRI signals High, and sets the C_PRI signal Low. Then, the CPU 101 accesses the register A_CG_REG 201 of the CG register unit 102 via the bus 117, and sets the A_CG_EN signal Low which indicates that the clock signal is supplied. At the same time, the operation state monitoring unit 504 detects that the image processing circuit 503 is started, and sets the C_CG_HW_EN signal Low.

At the time point t30, the RS request unit 203 detects that the A_CG_EN signal is Low (the sequencer 217 transitions to the normal_req state), and sets the A_RS_REQ signal at High. The RS request unit 505 detects that the C_CG_HW_EN signal is Low (the sequencer 506 transitions to the normal_req state), and sets the C_RS_REQ signal High. The factor of the transition to the standby state is the C_CG_HW_EN signal, therefore the C_CAUSE signal is set High.

The REQ signal is set High because the A_RS_REQ signal and the C_RS_REQ signal are High.

At a time point t31, the target selection unit 1102 detects that the REQ signal is High, and determines the SEL signal based on the truth table in FIG. 12. At this time, both the A_RS_REQ signal and the C_RS_REQ signal are simultaneously set High. In the first exemplary embodiment, the SEL signal indicates C because the C_CAUSE signal is set High. In the present exemplary embodiment, it is determined that A_is to be prioritized and the SEL signal becomes A because the A_PRI signal is set High. The response unit 1103 sets the OK signal High because the REQ signal is High. The target connection unit 1104 sets the A_RS_OK signal High based on the values of the SEL signal and the OK signal. Thus, the RS request unit 505 waits until the transition of the RS request unit 203 to the standby state is completed.

At a time point t32, the RS request unit 203 detects that the A_RS_OK signal is High (the sequencer 217 has transitioned to the normal do state), and sets the A_MODE signal Low. Thus, the transition to the standby state starts in the scan image processing unit 103.

At a time point t33, the RS request unit 203 detects that the A_STAT signal is Low (the sequencer 217 has transitioned to the normal mode state), and sets the A_RS_REQ signal Low.

At a time point t34, the target selection unit 1102 detects that the A_RS_REQ signal determined by the SEL signal becomes Low, and determines the SEL signal again. This time, the SEL signal indicates C because only the C_RS_REQ signal is High. The target connection unit 1104 sets the A_RS_OK signal Low, and sets the C_RS_OK signal High, based on the values of the SEL signal and the OK signal.

At a time point t35, the RS request unit 505 detects that the C_RS_OK signal is High (the sequencer 506 has transitioned to the normal do state), and sets the C_MODE signal Low. Thus, the transition to the standby state starts in the edit image processing unit 105.

At a time point t36, the RS request unit 505 detects that the C_STAT signal is Low (the sequencer 506 has transitioned to the normal mode state), and sets the C_RS_REQ signal Low.

At a time point t37, the target selection unit 1102 detects that the C_RS_REQ signal determined by the SEL signal has become Low, and determines the SEL signal again. This time, the SEL signal indicates NONE. The response unit 1103 sets the OK signal Low, because the REQ signal is set Low.

In the second exemplary embodiment as described above, the register (register PRI_REG 1101) that indicates the image processing unit prioritized to transition to the standby state is provided in the RS arbitration unit 118. In this configuration, the priority degree of the transition to the standby state can be set in accordance with the feature of the image processing unit. As a result, the scan image processing unit and the print image processing unit that execute the engine image processing can be prioritized to transition to the standby state, whereby the user waiting time can be suppressed. In the example illustrated in the present exemplary embodiment, the CPU 101 sets the value of the register (register PRI_REG 1101). Alternatively, the value of the register (register PRI_REG 1101) may be set in advance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-232520, filed Nov. 28, 2015, which is hereby incorporated by reference herein in its entirety.

What is claimed is:

1. A control apparatus comprising:
a first control signal output unit configured to output a first control signal;
a second control signal output unit configured to output a second control signal;
a plurality of first memories configured to receive the first control signal as input in sequence, wherein each memory of the plurality of first memories is able to be transition, in accordance with the first control signal, between a first power state and a second power state during which power consumed is lower than power consumed during the first power state;
a plurality of second memories configured to receive the second control signal as input in sequence, wherein each memory of the plurality of second memories is able to be transition, in accordance with the second control signal, from the first power state to the second power state; and
an arbitration unit configured to permit the first control signal output unit to output the first control signal to the plurality of first memories and to permit the second control signal output unit to output the second control signal to the plurality of second memories.

2. The control apparatus according to claim 1,
wherein the first control signal output unit or the second control signal output unit is configured to output, to the arbitration unit, transition target information indicating whether the first power state transitions to the second power state or the second power state transitions to the first power state, and wherein the arbitration unit is configured to issue a permission, to the first control signal output unit or the second control signal output unit, based on the transition target information.

3. The control apparatus according to claim 1,
wherein the first control signal output unit or the second control signal output unit is configured to receive a request for transition of the power state of the plurality of memories,
wherein the first control signal output unit or the second control signal output unit is configured to output an inquiry to the arbitration unit,
wherein, in response to the inquiry, the arbitration unit issues a permission,
wherein the first control signal output unit or the second control signal output unit receives the permission from the arbitration unit, and
wherein the first control signal output unit outputs the first control signal to the plurality of first memories in response to receiving the permission, and the second control signal output unit outputs the second control signal to the plurality of second memories in response to receiving the permission.

4. The control apparatus according to claim 3, wherein the arbitration unit is configured to issue the permission to the first control signal output unit or the second control signal output unit, in order in which the request for transition is received by the first control signal output unit or the second control signal output unit.

5. The control apparatus according to claim 3,
wherein the permission is a first permission, and
wherein, upon receiving a notification that the transition of the power state has been completed from the first control signal output unit to which the first permission has been issued, the arbitration unit is configured to issue a second permission to the second control signal output unit.

6. The control apparatus according to claim 3,
wherein the permission is a first permission, and
wherein the arbitration unit is configured not to issue a permission to at least the second control signal output unit, before receiving a notification that the transition of the power state has been completed from the first control signal output unit to which the first permission has been issued.

7. The control apparatus according to claim 3, further comprising a holding unit configured to hold information indicating the control signal output unit which is given a higher priority,
wherein the arbitration unit is configured to issue the permission to the control signal output unit that is given the higher priority preferentially based on the information held in the holding unit.

8. The control apparatus according to claim 3,
wherein the first control signal output unit or the second control signal output unit is configured to output, to the arbitration unit, information indicating a transition factor of the power state, and
wherein, based on the information indicating the transition factor of the power state, the arbitration unit is configured to issue the permission to one of either the first control signal output unit or the second control signal output unit.

9. A power saving control method for a control apparatus having a first control signal output unit configured to output a first control signal, a second control signal output unit configured to output a second control signal, a plurality of first memories, a plurality of second memories, and an arbitration unit, the power saving control method comprising:
transitioning, in a case where the plurality of first memories receives the first control signal as input in sequence, each memory of the plurality of first memories, in accordance with the first control signal, between a first power state and a second power state during which power consumed is lower than power consumed during the first power state;
transitioning, in a case where the plurality of second memories receives the second control signal as input in sequence, each memory of the plurality of second memories, in accordance with the second control signal, from the first power state to the second power state; and
permitting, by the arbitration unit, the first control signal output unit to output the first control signal to the plurality of first memories and the second control signal output unit to output the second control signal to the plurality of second memories.

* * * * *